United States Patent
Viaene et al.

(10) Patent No.: US 12,227,069 B2
(45) Date of Patent: Feb. 18, 2025

(54) DRIVE SYSTEM FOR VARIABLE DISTRIBUTION OF TORQUE TO WHEELS OF A VEHICLE

(71) Applicant: TRANSMISIONES Y EQUIPOS MECANICOS, S.A. DE C.V., Zedelgem (BE)

(72) Inventors: David Jacques J. Viaene, Ghent (BE); Jannick De Landtsheere, Sint-Kruis (BE); Nico De Visscher, Laarne (BE); Leroy De Ruijsscher, Wingene (BE); Johan Gerard M. Vancoillie, Roeselare (BE)

(73) Assignee: TRANSMISIONES Y EQUIPOS MECANICOS, S.A. DE CV (BE)

( * ) Notice: Subject to any disclaimer, the term of this patent is extended or adjusted under 35 U.S.C. 154(b) by 0 days.

(21) Appl. No.: 18/290,372

(22) PCT Filed: May 11, 2022

(86) PCT No.: PCT/EP2022/062766
§ 371 (c)(1),
(2) Date: Nov. 13, 2023

(87) PCT Pub. No.: WO2022/238475
PCT Pub. Date: Nov. 17, 2022

(65) Prior Publication Data
US 2024/0246411 A1 Jul. 25, 2024

(30) Foreign Application Priority Data
May 12, 2021 (EP) .................................... 21173630

(51) Int. Cl.
*B60K 23/08* (2006.01)
*B60K 6/365* (2007.10)
(Continued)

(52) U.S. Cl.
CPC .......... *B60K 23/0808* (2013.01); *B60K 6/365* (2013.01); *B60K 17/02* (2013.01);
(Continued)

(58) Field of Classification Search
CPC .... B60K 23/0808; B60K 6/365; B60K 17/02; B60K 23/04; B60K 2023/0841;
(Continued)

(56) References Cited

U.S. PATENT DOCUMENTS

| 8,215,440 B2 | 7/2012 | Hoffmann et al. ........... 180/247 |
| 2014/0342869 A1 | 11/2014 | Maurer et al. ......... B60K 17/16 |

(Continued)

FOREIGN PATENT DOCUMENTS

| CN | 106195193 | 4/2018 | ............. F16H 37/08 |
| CN | 115122825 A | * 9/2022 | ............... B60K 1/00 |

OTHER PUBLICATIONS

International Search Report and Written Opinion issued in PCT/EP2022/062766, dated Jul. 8, 2022, 10 pages.
(Continued)

*Primary Examiner* — Tinh Dang
(74) *Attorney, Agent, or Firm* — HAYES SOLOWAY P.C.

(57) ABSTRACT

A drive system for a vehicle for variable distribution of torque, from a primary input and secondary input, between a left wheel and a right wheel of a vehicle, the drive system includes a first and second torque output shaft, one for each of the left wheel and the right wheel, an open differential, and independently controllable first and second clutch packs, configured such that: torque from the primary input is transferred to each of the torque output shafts via the clutch packs; torque from the secondary input is transferred to each of the torque output shafts via the open differential; torque from one output of the open differential is summed with torque from one clutch pack output in the first torque
(Continued)

output shaft; and torque from another output of the open differential is summed with torque from the other clutch pack output in the second torque output shaft.

18 Claims, 9 Drawing Sheets

(51) Int. Cl.
 *B60K 17/02* (2006.01)
 *B60K 23/04* (2006.01)
 *F16H 48/06* (2006.01)
 *F16H 48/10* (2012.01)
 *F16H 48/22* (2006.01)

(52) U.S. Cl.
 CPC .............. *F16H 48/06* (2013.01); *B60K 23/04* (2013.01); *B60K 2023/046* (2013.01); *B60K 2023/0841* (2013.01); *B60K 2023/085* (2013.01); *B60K 2023/0866* (2013.01); *F16H 48/10* (2013.01); *F16H 48/22* (2013.01)

(58) Field of Classification Search
 CPC ........ B60K 2023/085; B60K 2023/046; B60K 2023/0866; F16H 48/06; F16H 48/10; F16H 48/22
 See application file for complete search history.

(56) References Cited

U.S. PATENT DOCUMENTS

| | | | |
|---|---|---|---|
| 2017/0136868 A1 | 5/2017 | Lee | B60K 6/365 |
| 2021/0107345 A1* | 4/2021 | Cooper | B60K 6/52 |

OTHER PUBLICATIONS

International Preliminary Report on Patentability issued in PCT/EP2022/062766, dated Nov. 14, 2023, 8 pages.

* cited by examiner

DRIVE SYSTEM FOR VARIABLE DISTRIBUTION OF TORQUE TO WHEELS OF A VEHICLE

FIELD OF THE INVENTION

The present invention is in the area of torque vectoring, in particular to a hybrid vehicle.

BACKGROUND TO THE INVENTION

All wheel drive (AWD) passenger vehicles are becoming more and more common. In an AWD vehicle, driving torque between the front and rear axles can be varied. Due to increases in powertrain performance, vehicles with single-axle drive are limited in terms of acceleration performance by the grip of the single axle. AWD vehicles can be divided into vehicles with permanent AWD, in which the two vehicle axles are always providing a certain portion of the vehicle tractive force at the same time, and vehicles with on-demand AWD, in which a primary (e.g. front) drive axle provides 100% or close to 100% of the tractive force for the most part of the driving conditions, and a secondary (e.g. rear) drive axle replaces a part or all of primary tractive force under specific circumstances, for instance, when slippage is detected. Those circumstances are typically computer-controlled. Based on the vehicle operating conditions (speed, steering input, throttle input, wheel slip, . . . ) the tractive force distribution is actively regulated e.g. by a computer. It is understood that tractive force, torque and power can always be positive or negative in this text.

In a typical mechanical on-demand AWD system for a vehicle, a power source (internal combustion engine (ICE) in the example) is mounted at the front with the front axle as primary drive axle. At the output of the main transmission, a propeller shaft is able to direct power to the rear. At the rear secondary drive axle, a clutch pack allows control of the amount of torque directed to the rear axle. This clutch torque is often controlled electrohydraulically or electromechanically, and with open clutch, the vehicle is pure front wheel drive for improved efficiency.

In recent years an increasing number of vehicles utilize a mechanical "torque vectoring" device on the secondary (e.g. rear) drive axle. This means that, rather than the secondary drive axle being equipped with an open type differential and its resulting 50/50 torque split across both wheels of the secondary drive axle, a more complex mechanical layout is present that allows the torque split between both wheels to deviate from 50/50, and to be actively controlled in function of vehicle operating conditions. One example of such torque vectoring device is given in U.S. Pat. No. 8,215,440, where the differential gear set is replaced with two clutch packs that directly regulate the torque transfer to each wheel.

The aim of the current invention is to provide an on-demand drive system with two drive input sources (e.g. ICE and EM), including a torque vectoring functionality having a number of advantages.

SUMMARY OF THE INVENTION

Provided is a drive system (100) for a vehicle for variable distribution of torque, from a primary input (10) and secondary input (12), between a left wheel (22) and a right wheel (32) of a vehicle, the drive system (100) comprising a first (20) and second (30) torque output shaft, one for each of the left wheel (22) and the right wheel (32), an open differential (40), and independently controllable first (50) and a second (52) clutch packs, configured such that:
  torque from the primary input (10) is transferred to each of the torque output shafts (20, 30) via the clutch packs (50, 52);
  torque from the secondary input (12) is transferred to each of the torque output shafts (20, 30) via the open differential (40);
  torque from one output (44) of the open differential (40) is summed with torque from one clutch pack (50) output (50b) in the first (20) torque output shaft; and
  torque from another output (46) of the open differential (40) is summed with torque from the other clutch pack (52) output (52b) in the second (30) torque output shaft.

The open differential (40) may be an open planetary differential (40').

The open planetary differential (40') may be configured such that torque from the secondary input (12) is transferred via a ring gear (42) of the planetary differential (40) to a planet carrier (42) of the planetary differential and to a sun gear (46) of the planetary differential, torque is transferred from the planet carrier (44) to one of the torque output shafts (20), and torque is transferred from the sun gear (46) to the other of the torque output shafts (30).

The central axes of rotation of the open differential (40), and two torque output shafts (20, 30), and two clutch packs (50, 52), and optionally an electric machine (EM) for generating torque as a source of the secondary input (12) may be co-axially aligned.

Further provided is a drive system (100) for a vehicle for variable distribution of torque, from a primary input (10) and secondary input (12), between a left wheel (22) and a right wheel (32) of a vehicle, the drive system (100) comprising a first (20) and second (30) torque output shaft, one for each of the left wheel (22) and the right wheel (32), an open differential (40), and independently controllable first (50) and a second (52) clutch packs, configured such that:
  torque from the primary input (10) is transferred to each of the torque output shafts (20, 30) via the clutch packs (50, 52), wherein the first clutch pack (50) is configured for variable transmission of torque between the primary input (10) and the first torque output shaft (20), and the second clutch pack (52) is configured for variable transmission of torque between the primary input (10) and the second torque output shaft (30);
  torque from the secondary input (12) is transferred to each of the torque output shafts (20, 30) via the open differential (40) that is an open planetary differential (40') configured such that torque from the secondary input (12) is transferred via a ring gear (42) of the open planetary differential (40) to a planet carrier (42) of the open planetary differential (40') and to a sun gear (46) of the open planetary differential, torque is transferred from the planet carrier (44) to the first torque output shafts (20), and torque is transferred from the sun gear (46) to the second torque output shafts (30);
  torque from the planet carrier (44) of the open planetary differential (40') is summed with torque from the first clutch pack (50) output (50b) in the first (20) torque output shaft; and
  torque from the sun gear (46) of the open planetary differential (40') is summed with torque from the second clutch pack (52) output (52b) in the second (30) torque output shaft, wherein the central axes of rotation of the open differential (40), and of the two torque output shafts (20, 30), and of the two clutch packs (50, 52) are co-axially aligned.

The drive system (100) may further comprise a secondary input (12) gear set (60) configured to change, preferably reduce, a rotation speed of the source of secondary input (10) before entering the clutch pack (50, 52). The secondary input (12) gear set (60) may be a compound planetary gear set (60'), wherein the source of the secondary input (12) drives a sun gear (62) of the compound planetary gear set (60'), and the output of the compound planetary gear set (60')—a planet carrier (65)—transmits torque to an input of the open differential (40).

An output of the source of the secondary input (12) may be selectably engageable with or disengageable from the open differential (40). The selectable engagement with or disengagement from the open differential (40) may be realised by a secondary input disconnect (80) is positioned between the output of the secondary input (12) gear set (60), and the open differential (40).

The drive system (100) may further comprise a primary input gear set (16) configured to change, preferably reduce, a rotation speed of the source of the primary input (10) before entering the clutch pack (50, 52).

Torque from the primary input (10) may be sourced from an Internal Combustion Engine (ICE) and torque from the secondary input (12) is sourced from an EM, or torque from the primary input (10) may be sourced from an EM and torque from the secondary input (12) is sourced from an Internal Combustion Engine (ICE).

Further provided is vehicle drive line for an on-demand all wheel drive, AWD, vehicle comprising:
- a front axle driven by a source of primary input (10) (e.g. ICE);
- a rear axle driven by the drive system (100) as described herein comprising a source of secondary input (12) (e.g. EM);
- a drive shaft (82) for transfer of torque between the front axle and rear axle), optionally wherein the source of the secondary input (12) is selectably engagable with or disengagable from the open differential (40).

Further provided is an adapted drive system (100') for a vehicle for variable distribution of torque from a primary input source and a secondary input source between a left wheel (22) and a right wheel (32) of a vehicle, the drive system (100) comprising:
- a first (20) and second (30) torque output shaft, one for each of the left wheel (22) and the right wheel (32);
- an open differential (40) having one torque input (42) and two torque outputs (44,46);
- independently controllable first (50) and a second (52) clutch packs, each having a clutch pack input (50a, 52a) mutually connected in fixed rotational relation, and each having a clutch pack output (50b, 52b), one clutch pack output (50b) connected to the first torque output shaft (20) and one clutch pack output (52b) connected to the second torque output shaft (30);
- a cylindrical gear stage (110) comprising a layshaft (85) on which is attached:
  - a fixed gear (16a) meshed to a gear (16b) connected in fixed rotational relation to the input (50a, 52a) of the clutch packs (50, 52); and
  - an additional fixed gear (112a) meshed with a gear (112b) connected in fixed rotational relation to an input (42) of the open differential (40), configured such that:
- torque from the primary input source (ICE) and secondary input source (EM) is summed and transferred to the input (42) of the open differential (40) which outputs (44, 46) torque to the first (20) and second (30) torque output shafts;
- torque from the primary input source (ICE) and secondary input source (e.g. EM) is summed and also transferred along the layshaft (85) to the clutch pack inputs (50a, 52a);
- torque from an open differential (40) output (44) is summed with torque from one clutch pack (50) output (50b) in the first (20) torque output shaft; and
- torque from the another differential (40) output (46) is summed with torque from one clutch pack (50) output (52b) in the second (30) torque output shaft.

Further provided is a vehicle drive line for a normally rear-wheel drive vehicle or a vehicle in which rear-wheel drive is the primary drive comprising:
- a source of primary input (10) (e.g. ICE);
- rear axle driven with the drive system (100) as described herein or with the adapted drive system (100') as described herein, comprising a source of secondary input (12);
- a transmission and/or drive shaft (82) for transfer of torque between the source of primary input (10) and the primary input (10) of the drive system (100), optionally wherein the source of the secondary input (12) is selectably engagable with or disengagable from the open differential (40).

FIGURE LEGENDS

DETAILED DESCRIPTION OF INVENTION

Figure 1:
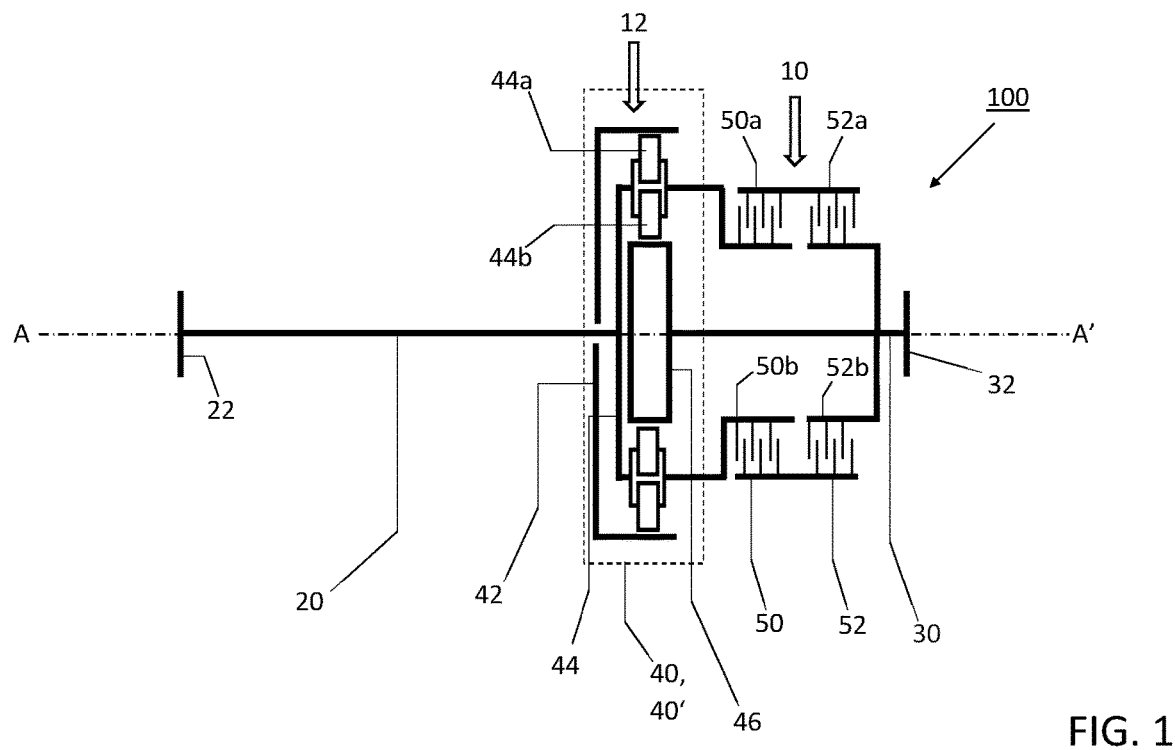
FIG. 1 is a schematic view of a drive system described herein.
Figure 2:
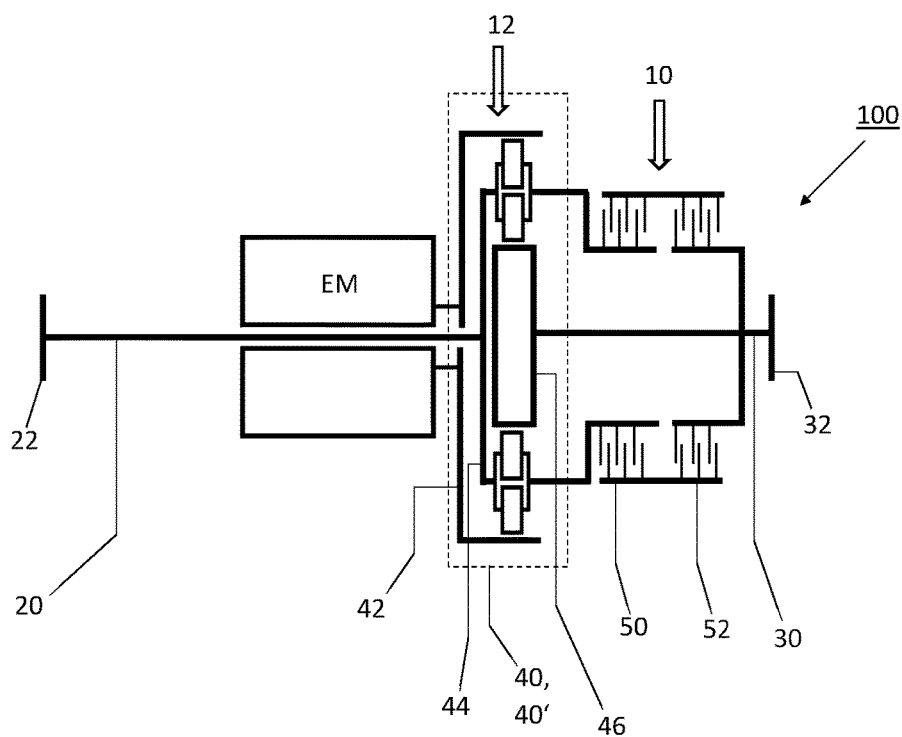
FIG. 2 shows the drive system of FIG. 1 wherein the secondary input is sourced from an electric machine (EM) for generating torque.

Before the present system and method of the invention are described, it is to be understood that this invention is not limited to particular systems and methods or combinations described, since such systems and methods and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" or "approximately" refers is itself also specifically, and preferably, disclosed.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

In the present description of the invention, reference is made to the accompanying drawings that form a part hereof, and in which are shown by way of illustration only of specific embodiments in which the invention may be practiced. Parenthesized or emboldened reference numerals affixed to respective elements merely exemplify the elements by way of example, with which it is not intended to limit the respective elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

It is to be understood that other embodiments may be utilised and structural or logical changes may be made without departing from the scope of the present invention. The following detailed description, therefore, is not to be taken in a limiting sense, and the scope of the present invention is defined by the appended claims.

Provided is a drive system (100) for a vehicle for variable distribution of torque, from a primary input (10) and secondary input (12), between a left wheel (22) and a right wheel (32) of a vehicle. An exemplary drive system is shown in FIGS. 1 to 7. The drive system comprises a first (20) and second (30) torque output shaft, one for each of a left wheel (22) and a right wheel (32). It further comprises an open differential (40). It further comprises a first (50) and a second (52) clutch pack. Output (50*b*) of a first clutch pack (50) is transferred to a first (e.g. left) torque output shaft (20). Output (52*b*) of a second clutch pack (52) is transferred to a second (e.g. right) torque output shaft (30). The drive system (100) is configured such that torque from the primary input (10) is controllably transferred to each of the torque output shafts (20, 30) via a separate clutch pack (50, 52). It is also configured such that torque from the secondary input (12) is transferred to each of the torque output shafts (20, 30) via the open differential (40). It is also configured such that torque from one open differential (40) output (44) is summed with torque from one clutch pack (50) output (50*b*) in the first (20) torque output shaft. It is also configured such that torque from the other open differential (40) output (46) is summed with torque from the other clutch pack (52) output (52*b*) in the second (30) torque output shaft.

The drive system (100) drives the front or rear axle, preferably the rear axle of the vehicle.

The drive system (100) more preferably drives a secondary (e.g. rear) axle of an on-demand AWD vehicle.

Most preferably, torque from the primary input (10) is sourced from a (front axle) Internal Combustion Engine (ICE) and torque from the secondary input (12) is sourced from a (rear axle) Electric machine (EM) (FIGS. 2 to 7) However, other combinations are foreseen:

torque from the primary input (10) may be sourced from an EM and torque from the secondary input (12) may be sourced from an Internal Combustion Engine (ICE), or torque from the primary input (10) may be sourced from an EM and torque from the secondary input (12) may be sourced from a different EM.

The EM may be an electric motor/generator.

The drive system (100) is preferably for an on-demand AWD vehicle. As mentioned, in a vehicle with on-demand AWD, a main primary (e.g. front) drive axle provides 100% or close to 100% of the tractive force for the most part of the driving conditions, and a secondary (e.g. rear) drive axle replaces a part or all or of the tractive force under specific circumstances. The drive system (100) is preferably for an on-demand AWD vehicle having a primary (front) axle driven by a front-mounted ICE, and a secondary (rear) axle disposed with the present drive system (100) wherein the source of the primary input (10) is the ICE, and the source of the secondary input (12) is an EM, which drive system (100) provides on-demand provide tractive force to the rear wheels, and also torque vectoring.

The present configuration allows a selection of torque to the wheels that is pure primary input (e.g. pure ICE), or that is pure secondary input (e.g. pure EM), or that is a combination of primary input and secondary input by individual actuation of the clutch packs.

In pure secondary input mode (e.g. pure EM) both clutch packs are open and torque is distributed via the open differential. This is preferred compared to a standard configuration where torque sourced from an ICE and/or EM passing through only one input that is distributed through the pair of clutch packs. Driving through clutch packs requires, for controllability reasons, a certain slip across the clutch to enable accurate torque control; there are mechanical losses associated, in addition to thermal effects and wear. Not driving through slipping clutch packs reduces the durability requirements and/or wear risk for the clutch packs. Additional mechanisms for overall cooling requirements are reduced. With the two clutch packs fully open, it is also avoided that the components associated with the primary input (e.g. a bevel set and prop shaft) are spinning with associate losses in pure EM mode. As electric driving range is critical in any hybrid vehicle, the present arrangement provides maximized efficiency from an e-drive perspective.

An inherent disadvantage of torque vectoring systems in which all input drive torque (primary and secondary input) is passed only through clutch packs, is that torque can only be transferred across the clutch pack from the fastest spinning to the slowest spinning side of the clutch. A typical example is a front wheel drive vehicle, having primary and secondary torque sources at the front, and a rear axle that drives through two clutch packs. A small gear ratio difference front-rear is provided to allow the torque to be transferred also to the outside rear wheel in a bend (i.e. the faster spinning wheel), also in conditions where front wheel slip is low. Because of that ratio difference, it is typically not possible to have negative (braking) torque vectoring towards the rear axle in such vehicle, since the relative speeds do not allow braking torque through the clutches. With the present configuration, that disadvantage is overcome because the secondary input (12) can provide a torque offset (negative or braking torque to both wheels) that allows torque vectoring to happen with positive torque across the clutch pack, in the direction of the relative speed across the clutch pack that is setup for positive or driving torque. In hybrid operating mode (primary and secondary inputs activated), there is torque vectoring functionality (vehicle yaw torque can be generated regardless of the sign of wheel differential speed) through the clutch packs and the primary drive source.

Figure 11:
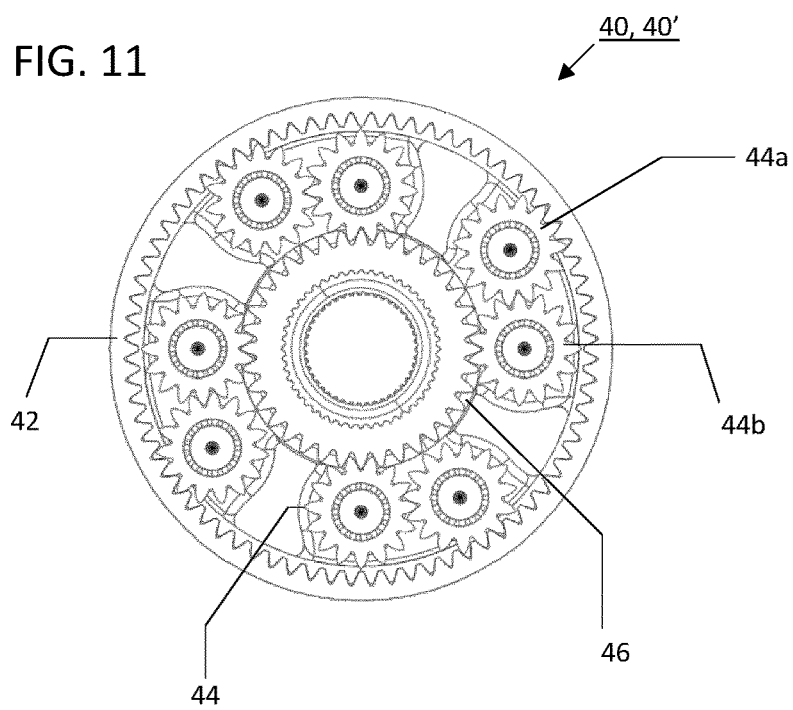
FIG. 11 is a schematic view of an open differential described herein.

The open differential (40) has a torque input and two torque outputs. The secondary input (12) is the input to the open differential (40). The open differential (40) may be an open planetary differential (40') (epicyclic differential). An open planetary differential (40') is known in the art. An exemplary open planetary differential (40') is shown in FIG. 11. It typically comprises a sun gear (46) (with outer facing teeth) and a ring gear (42) (with at least inner facing teeth) having co-axial centres of rotation, concentrically arranged. The sun gear (46) and ring gear (42) both mesh with a set of planet gears (44a or 44b)—supported by a planet carrier (44)—disposed between them. The planet gears rotate and roll without slip. Rolling of the planet gears causes rotation of the planet carrier (44). There may be one (e.g. 44a), two (e.g. 44a and 44b) or more planet gear sets. An input to the open planetary differential (40') may be the ring gear (42) and the outputs of the open planetary differential (40') may be planet carrier (44) and the sun gear (46). The torque may be split 50:50 between the outputs by the open differential (40).

Torque from the secondary input (12) is preferably transferred via a ring gear (42) of the planetary differential (40) to a planet carrier (42) of the planetary differential and to a sun gear (46) of the open planetary differential (40'). Torque is preferably transferred from the planet carrier (44) to one of the torque output shafts (e.g. first torque output shaft (20)). The planet carrier (44) may be directly connected to one of the torque output shafts (e.g. first torque output shaft (20)) such that they rotate synchronously (direct connection, no intervening gears). Torque is preferably transferred from the sun gear (46) to the other of the torque output shafts (e.g. second torque output shaft 30) The sun gear (46) may be directly connected to other of the torque output shafts (e.g. second torque output shaft 30) such that they rotate synchronously (direct connection, no intervening gears).

Preferably, the open planetary differential (40') has two planet gear sets (44a, 44b) mounted on the planet carrier (44). Each gear from one set meshes with a corresponding gear from the other set, and gears from one set mesh with the ring gear (42) and gears from the other set mesh with the sun gear (46). An example is shown in FIG. 11.

The drive system may have a central axis of rotation (A-A') (e.g. FIG. 1). Axes of rotation of the open differential (40) (e.g. planetary differential), and two torque output shafts (20, 30), and two clutch packs (50, 52) may be mutually co-axially aligned, and also aligned with the central axis of rotation (A-A') of the drive system. The axes of rotation of the open differential (40) (planetary differential), and two torque output shafts (20, 30), and two clutch packs (50, 52) and EM (where present) may all align co-axially and with the central axis of rotation (A-A') of the drive system. The co-axial alignment reduces radial bulk thereby increasing space within the vehicle cabin.

The secondary input (12) is the input (ring gear) (42) to the open differential (40). The secondary input, SI, (12) may be sourced from an EM or an ICE, preferably an EM. The EM is electrically powered and generates torque (e.g. is an electric motor). It may also generate negative (braking) torque, sometimes called regeneration (e.g. is an electrical generator). Regeneration leads to charging of a battery. Where an EM is the source for the secondary input (12), it is known herein as a secondary input EM, or SIEM. Where an ICE is the source for the secondary input (12), it is known herein as a secondary input ICE, or SIICE. In a hybrid vehicle, the secondary input (12) is an EM (and the primary input (10) is an ICE). The drive system (100) may further comprise the SIEM or SIICE. The torque output (negative or positive) of the SIEM or the SIICE drives the open differential (40), in particular the ring gear (42). The torque output of SIEM or an SIICE may enter the open differential (40) with or without gearing to match the speed of the SIEM or an SIICE to the vehicles wheel speed.

Where the EM is the source of the secondary input, SI, (12), it may be integrated into or disposed adjacent to the drive system (100). It may be provided on the rear axle. The SIEM may be disposed concentrically over the first torque output shaft (20) or over the second torque output shaft (30). In FIGS. 2 to 7, the SIEM is disposed concentrically over the first torque output shaft (20). The SIEM may or may not extend axially beyond the axial length of the first torque output shaft (20). Alternatively, SIEM may not or may not extend axially beyond the axial length second torque output shaft (30). The SIEM may be disposed over one (e.g. $1^{st}$) torque output shaft (20) and the clutch packs (50, 52) disposed over the other (e.g. $2^{nd}$) torque output shaft (30).

Figure 5:
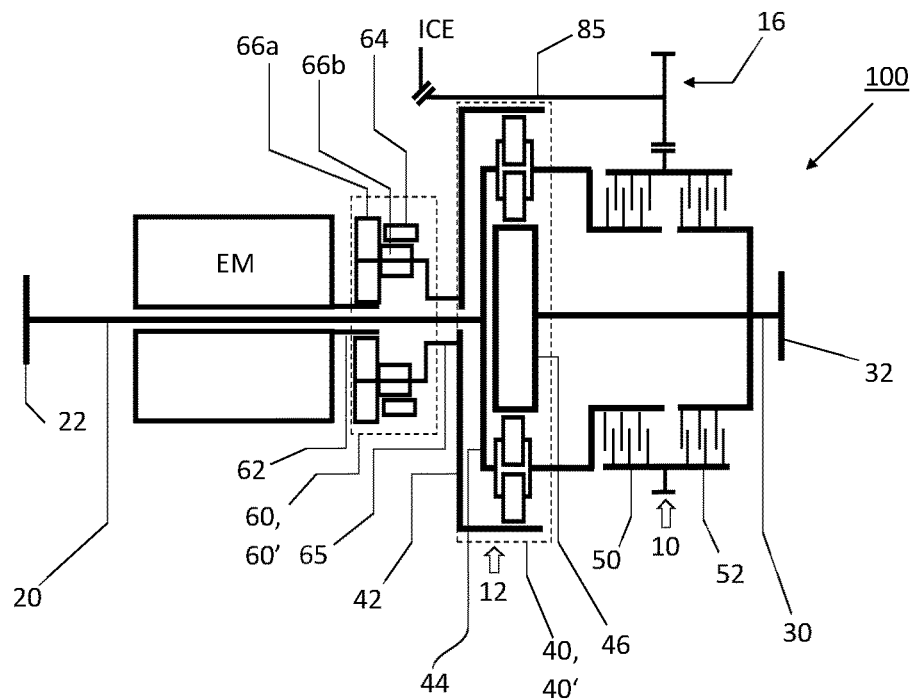
FIG. 5 shows the drive system of FIG. 3 wherein the speed of the EM is changed by a secondary input (12) gear set (60) before entering the open differential (40).

The speed of output of the SIEM or the SIICE may be changed, preferably reduced, by a secondary input (12) gear set (60) before entering the open differential (40). The secondary input (12) gear set (60) may be a compound planetary gear set (60'). The secondary input (12) gear set (60) that is a compound planetary gear set (60') is used in particular when the source of the secondary input (12) is an EM. An example of a secondary input (12) gear set (60) that is compound planetary gear set (60') is shown in FIG. 5. The drive system (100) may further comprise the secondary input (12) gear set (60), preferably the compound planetary gear set (60').

The compound planetary gear set (60') is known in the art. It comprises a rotatable sun gear (62) (with outer facing teeth) and a stationary ring gear (64) with at least inner facing teeth) having co-axial centres. The rotatable sun gear (62) and a stationary ring gear (64) may or may not axially overlap The sun gear (62) and the ring gear (64) both mesh with a set (66a, 66b) of planet gears—supported by a planet carrier (65)—disposed between them. The planet gears (66a, 66b) rotate and roll without slip. Rolling of the planet gears (66a, 66b) causes rotation of the planet carrier (65).

There may be one, two or more planet gear sets. Preferably, the compound planetary gear set (60') has two planet gear sets (66a, 66b) mounted on the planet carrier. Gears of one set (66b) may be smaller than the gears of the other set (66a). Each gear from one set (66a) is connected in fixed axial rotation to the corresponding gear from the other set (66b), and gears from one set (66b) mesh with the stationary ring gear (64) and gears from the other set (66a) mesh with the sun gear (62).

The output of the SIEM or the SIICE drives the sun gear (62) of the compound planetary gear set (60'). It may be directly connected to the sun gear (62) such that they rotate synchronously (no intervening gears). The output of the compound planetary gear set (60')—planet carrier (65)— enters the open differential (40). The planet carrier (65) may be directly connected (optionally disconnectable) to the open planetary differential (40') ring gear (42) such that they rotate synchronously (no intervening gears). As mentioned, the compound planetary gear set (60') may change the speed (preferably reduce) of output of the SIEM or the SIICE before entering the open differential (40). A gear ratio selection mechanism may be disposed in the SI gear set (60, 60'). In particular with a compound planetary type reduction set (60'), having 2 gear ratios can be implemented at low additional cost (e.g. adding a clutch or brake device to one of the planetary gear set components).

The speed reduction introduced by the secondary input (12) gear set (60) matches the operational range of the source of the secondary input to the speed range of vehicle wheel. An SIEM operates typically at rotational speeds higher than the vehicle wheel speed. The secondary input (12) gear set (60) hence allows the SIEM to be lower in torque. A lower torque/higher speed EM means smaller size, weight and cost of the EM. The secondary input (12) gear set (60) that is a compound planetary gear set (60') is a compact and cost-efficient way to generate a high gear ratio. It combines two planetary sets in a row, but removes some components (e.g. only 1 sun, only 1 ring gear).

The output of the SIEM or the SIICE may be selectably engagable with or disengagable from the open differential (40). In other words, there may be two selectable states: engaged or disengaged. Decoupling of an SIEM at high vehicle speed avoids over-speeding of the SIEM. The arrangement further allows the SIEM to be decoupled in situations where the primary drive source (e.g. ICE) is selected on-demand as only drive source, avoiding continuous energy losses in the EM.

Figure 4:
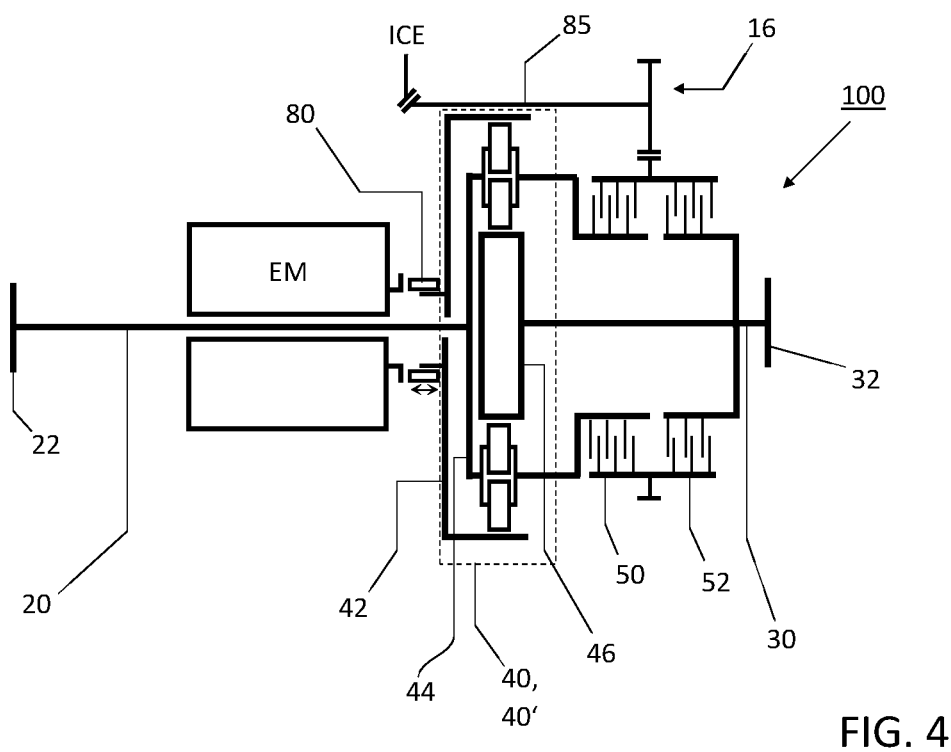
FIG. 4 shows the drive system of FIG. 3 wherein the output of the EM is disconnectable.
Figure 6:
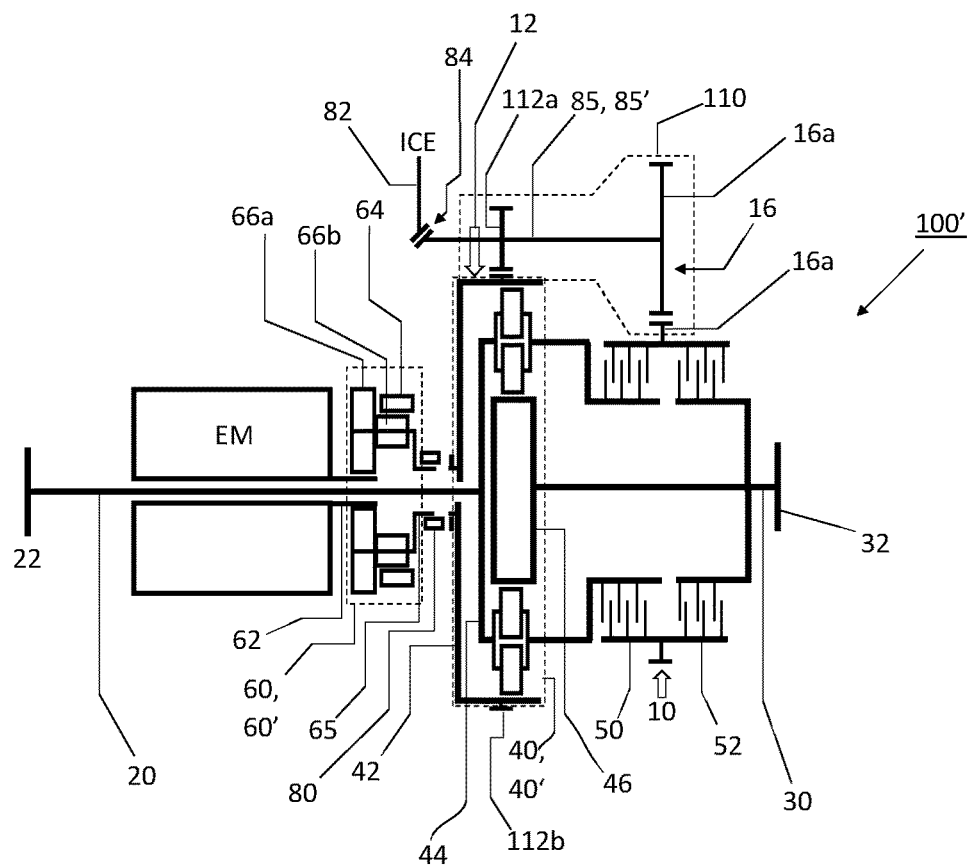
FIG. 6 shows the drive system of FIG. 1 provided with a cylindrical gear stage (110).

The output of the SIEM or the SIICE may be selectably engaged with or disengaged from the open differential (40) using a secondary input disconnect (80) comprising an element slidable between a closed position that engages the SIEM or the SIICE with the open differential (40) so they are revolutely locked or synchronised, and an open position that disengages the SIEM or the SIICE from the open differential (40) so they are able to rotate independently (e.g. FIGS. 4 and 6). The slidable element may be part of a dog clutch, or multiplate clutch, or have grooves that slidably engage with splines. The secondary input disconnect (80) may be located between the secondary input (12) gear set (60) and the open differential (40) (FIG. 6). More specifically, the secondary input disconnect (80) may be disposed between the output of the secondary input (12) gear set (60) (e.g. planet carrier (65)) and the input the open differential (40) (e.g. the ring gear (42)) (FIG. 6); this configuration minimises losses when the disconnection location is disconnected. Alternatively, the secondary input disconnect (80) may be located between the SIEM or the SIICE and the secondary input (12) gear set (60). The secondary input disconnect (80) may be all-or-nothing (on-off) disconnect. The drive system (100) may thus be further provided with a secondary input disconnect (80), configured to selectably connect or disconnect transmission of torque between the secondary input (12) and the open differential (40).

The output of the SIEM or the SIICE may be selectably engaged with or disengaged from the open differential (40) by a selectable locking-unlocking of the compound planetary gear set (60') ring gear (64) to its housing. When locked, the ring gear (64) is stationary, torque is transferred from the sun gear (62) to the planet carrier (65), and SIEM or the SIICE is engaged. When unlocked, the compound planetary gear set (60') is unable to transfer any torque and SIEM or the SIICE is disengaged The primary input, PI, (10) is the input (50a, 52a) to the gear packs (50, 52). The primary input, (10) may be sourced from an ICE or an EM, preferably an ICE. In a hybrid vehicle, the primary input (10) is an ICE (and the secondary input (12) is an EM). Where an ICE is the source for the primary input (10), it is known herein as a primary input ICE, or PIICE. Where an EM is the source for the primary input (10), it is known herein as a primary input EM, or PIEM. The torque output of the PIICE or PIEM is inputted to the clutch packs (50, 52). The torque output of PIICE or PIEM may enter the clutch packs (50, 52) with or without gearing to change the speed of the PIICE or PIEM output.

Figure 3:
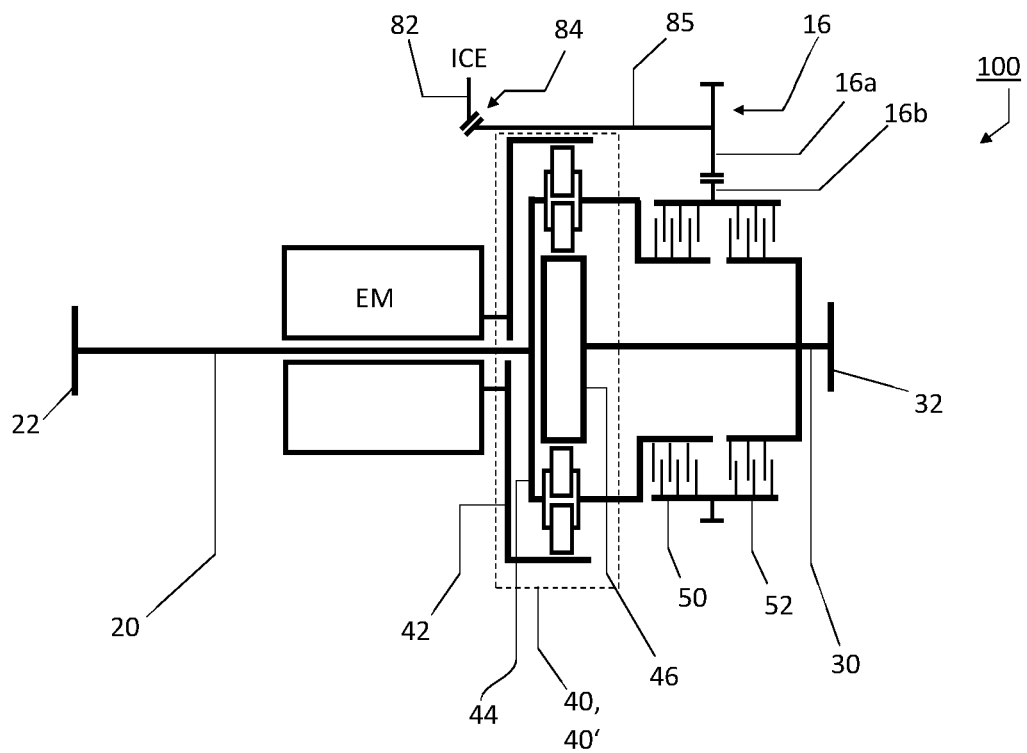
FIG. 3 shows the drive system of FIG. 2 wherein the speed of output of the primary input (10) is changed by a primary input (10) gear set (16) before entering the clutch packs (50, 52)

The PIICE or PIEM may be disposed at the front axle of the vehicle, and the drive system (100) disposed at the rear axle; torque is transferred from the PIICE or PIEM via a drive shaft (82) (FIG. 3). Hence, the torque from the primary input (10) may be inputted into the drive system (100) from the front-placed PIICE or PIEM via the drive shaft (82). The direction of the drive shaft (82) axis of rotation may be perpendicular to the central axis of rotation (A-A') of the drive system; a bevel gear set (84) may be used to transfer torque and to change its transmission direction. The bevel gear set (84) may or may not change the speed of the drive shaft (82). The bevel gear set (84) may reduce the speed of the drive shaft (82).

PIICE or PIEM may be disposed at the front axle, providing the vehicle with a primary front drive axle. The output of the PIICE or PIEM preferably passes through a front axle clutch/gearbox, and the primary front drive axle provides tractive force for the most part of the driving conditions. The drive shaft (82) is preferably connected to an output of the front axle gearbox. The twin clutches (50, 52) of the drive system (100) fulfil the front-rear torque split that an AWD vehicle provides, in addition to the torque vectoring.

The speed of output of the PIEM or the PIICE may be changed, preferably reduced, by a primary input (10) gear set (16) before entering the clutch packs (50, 52). Where a drive shaft (82) is present, the speed of drive shaft (82) is changed (preferably reduced) by the primary input (10) gear set (16) and optionally additionally by the bevel gear set (84).

The primary input (10) gear set (16) may comprise (e.g. FIGS. 3 to 5) a layshaft (85) disposed parallel to the central axis (A-A') of the drive system (100) to which a fixed gear (16*a*) is attached, and torque is transferred from the layshaft (85) via the fixed gear (16*a*) to the input (50*a*, 52*a*) of the clutch packs (50, 52). The layshaft (85) may or may not be driven by the bevel gear set (84). One gear of the bevel gear set (84) may be fixed to the layshaft (85). The fixed gear (16*a*) of the primary input (10) gear set (16) may be meshed to a gear (16*b*) connected in fixed rotation to the input (50*a*, 52*a*) of the clutch packs (50, 52). The layshaft (85) enables placement of the PI input shaft (82) within a central region of the entire system, and hence approaching a symmetrical packaging envelope. The layshaft (85) has an added advantage of flexible ratio change, by changing gear set (16), which involves less steps or cost than changing the ratio of a bevel gear set, and has no effect on the overall packaging. It is appreciated that the primary input (10) gear set (16) does not need to include a layshaft (85); speed change may be realised via the bevel gear set (84), one of the bevel gears being installed onto the clutch input (large bevel gear).

The independently controlled clutch packs (50, 52) provide a mechanism for adjusting a distribution of torque from the PIICE or PIEM between the first torque output shaft (20) and the second torque output shaft (30) of the drive system (100). Controllable distribution of torque between left and right wheel, known as torque vectoring, makes use of this principle.

Figure 8:
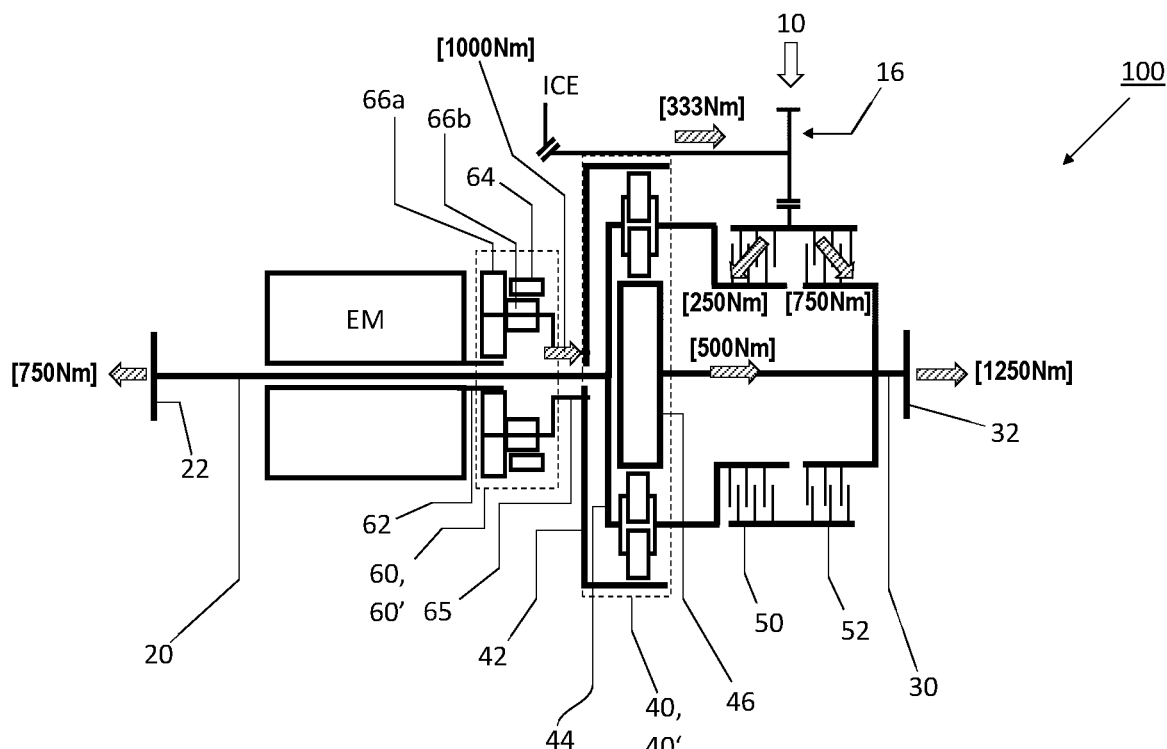
FIG. 8 shows the drive system of FIG. 5, and torque paths indicated positive torque from primary and secondary inputs.

An example of torque vectoring is shown in FIG. 8. Drive torque (333 Nm) is supplied from the ICE as primary input (10). After passing though the primary input gear set (16) it enters (1000 Nm) both clutch packs (50, 52) where it is split according to the extent of closure of each clutch pack. The first clutch pack (50) is less closed than the second gear pack (52). Driving torque (250 Nm) is transferred across the first gear pack (50) to the first torque output shaft (20). At the same time, the EM introduces additional torque (1000 Nm) to the open differential (40), that is split 50-50: torque (500 Nm) from the open differential (40) is transmitted to the first torque output shaft (20), where it is combined with the driving torque (250 Nm) from the first gear pack (50)—the net result is torque (750 Nm) to the left wheel (30). Driving torque (750 Nm) is also transferred across the second gear pack (52) to the second torque output shaft (30). At the same time, torque (500 Nm) from the open differential (40) is transmitted to the second torque output shaft (30), where it is combined with the driving torque (750 Nm) from the second clutch pack (52)—the net result is torque (1250 Nm) to the right wheel (32).

The first clutch pack (50) is configured for variable transmission of torque between the primary input (10) and the first torque output shaft (20). The second clutch pack (52) is configured for variable transmission of torque between the primary input (10) and the second torque output shaft (30). The first and second clutch packs (50, 52) may be friction clutches, provided with clutch plates. The transmission of torque across each clutch pack is adjusted by the application of force (e.g. from a hydraulic piston, or electromechanical actuator) to the clutch pack.

Each clutch pack (50, 52) has a clutch input (50*a*, 52*a*) and a clutch output (50*b*, 52*b*) (FIG. 1). The primary input (10) is the clutch inputs (50*a*, 52*a*). The clutch inputs (50*a*, 52*a*) may rotate at the same speed. Their rotation speeds may be synchronised for instance by a fixed connection between both clutch inputs (50*a*, 52*a*). The clutch inputs (50*a*, 52*a*) may be concentrically disposed outwards from the clutch outputs (50*b*, 52*b*). The first clutch pack (50) clutch output (50*b*) may be connected to the first torque output shaft (20). It may be directly connected to the planet carrier (44) of the open differential (40) such that they rotate synchronously (no intervening gears). The second clutch pack (52) clutch output (52*b*) may be connected to the second torque output shaft (30). It may be directly connected to the second torque output shaft (30) such that they rotate synchronously (no intervening gears). Driving torque is variably transferred, depending on the extent of clutch pack (50, 52) closure, from the clutch input (50*a*, 52*a*) to the clutch output (50*b*, 52*b*), when the rotation speed of the clutch input (50*a*, 52*a*) is higher than that of the clutch output (50*b*, 52*b*). In the case that the rotation speed order is inversed (rotation speed of the clutch output (50*b*, 52*b*) is higher than that of the clutch input (50*a*, 52*a*)), torque transfer is possible, and it has an effect of braking the wheels.

The clutch packs (50, 52) may be disposed concentrically over the first torque output shaft (20) or over the second torque output shaft (30). The clutch packs (50, 52) may or may not extend axially beyond the axial length of the first torque output shaft (30). Alternatively, clutch packs (50, 52) may or may not extend axially beyond the axial length second torque output shaft (30).

The secondary input (12) can provide a negative (braking) torque towards the rear axle when secondary input (12) is engaged with the open differential (40). A net effect of the negative torque distributed via the open differential (40) and a positive torque distributed via the clutch packs is that a variable negative torque can be controllably applied to each torque output shaft (20, 30)) by controlling each clutch pack (50, 52).

Positive torque is still supplied as primary input (10) to both clutch packs (50, 52), because the speed of rotation to the clutch inputs (50*a*, 52*a*) is higher than the rotation speed of the clutch outputs (50b, 52b). This means that one torque output shaft (e.g. second torque output shaft 30) can receive positive torque from the primary input (10) through closure of the connected clutch (e.g. second clutch pack 52)), and the other torque output shaft (e.g. first torque output shaft 20) can receive no positive torque from the primary input (10) through opening of the clutch, and both torque output shafts (20, 30) can receive negative torque from the secondary input (10) in a regeneration (coasting) mode-via the open differential (40). The sum of positive and negative torques from the primary input (10) and secondary input (12) respectively can lead to different regenerative braking of one torque output shaft (e.g. first torque output shaft 20) compared with the other torque output shaft (e.g. second torque output shaft 30). This allows torque vectoring with positive torque across the activated clutch pack (e.g. second clutch pack 52)), in the direction of the relative speed across the clutch pack that is setup for positive or driving torque.

Braking torque can be applied in particular to regenerative braking when the source of secondary input (12) is an EM; the SIEM can provide a negative (regenerative braking) torque towards the rear axle when it is in a regeneration mode that supplies current for battery charging. For hybrid vehicles, the source of the primary input (10) is an ICE that produces, during regenerative braking, a higher rotation to the clutch inputs (50a, 52a) compared with the clutch outputs (50b, 52b) limits to positive torque transfer, and the secondary input (12) source, the EM, introduces the required negative braking torque.

Figure 7:
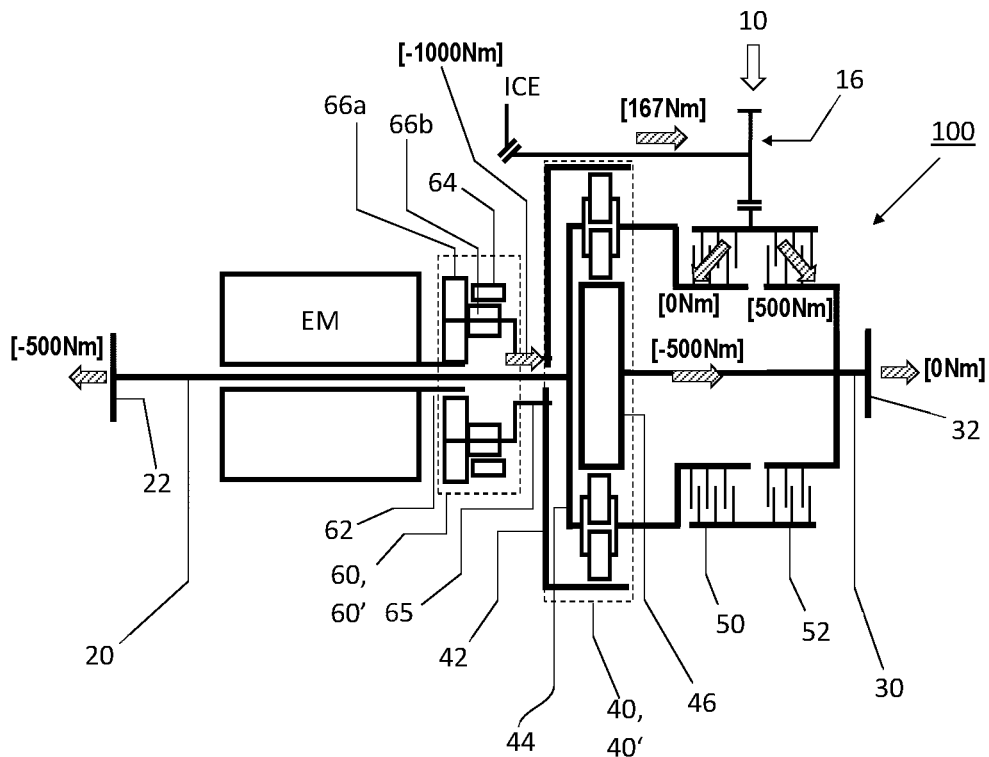
FIG. 7 shows the drive system of FIG. 5, and torque paths indicated for torque vectoring while braking.

An example of regenerative braking combined with torque vectoring is shown in FIG. 7. Drive torque (167 Nm) is supplied from the ICE as primary input (10). In this example, the ICE is in coast mode too, providing engine braking (not regenerative), and the 167 Nm is an increased braking at the front wheels to transfer the torque to the rear where it is recuperated into the EM. After passing though the primary input gear set (16) the drive torque enters both clutch packs (50, 52). The first clutch pack (50) is open and the second gear pack (52) is closed; driving torque (500 Nm) is transferred only across the second gear pack (52) to the second torque output shaft (30). At the same time, the EM in regeneration mode introduces a negative torque (−1000 Nm) to the open differential (40), that is split 50-50: negative torque (−500 Nm) from the open differential (40) is transmitted to the second torque output shaft (30), where it is combined with the driving torque (+500 Nm) from the second gear pack (52)—the net result is zero torque (0Nm) to the right wheel (32). Negative torque (−500 Nm) from the open differential (40) is also transmitted to the first torque output shaft (20), where it is combined with the zero torque (+0 Nm) from the first gear pack (50)—the net result is a braking torque (minus 500 Nm) to the left wheel (30).

Figure 10:
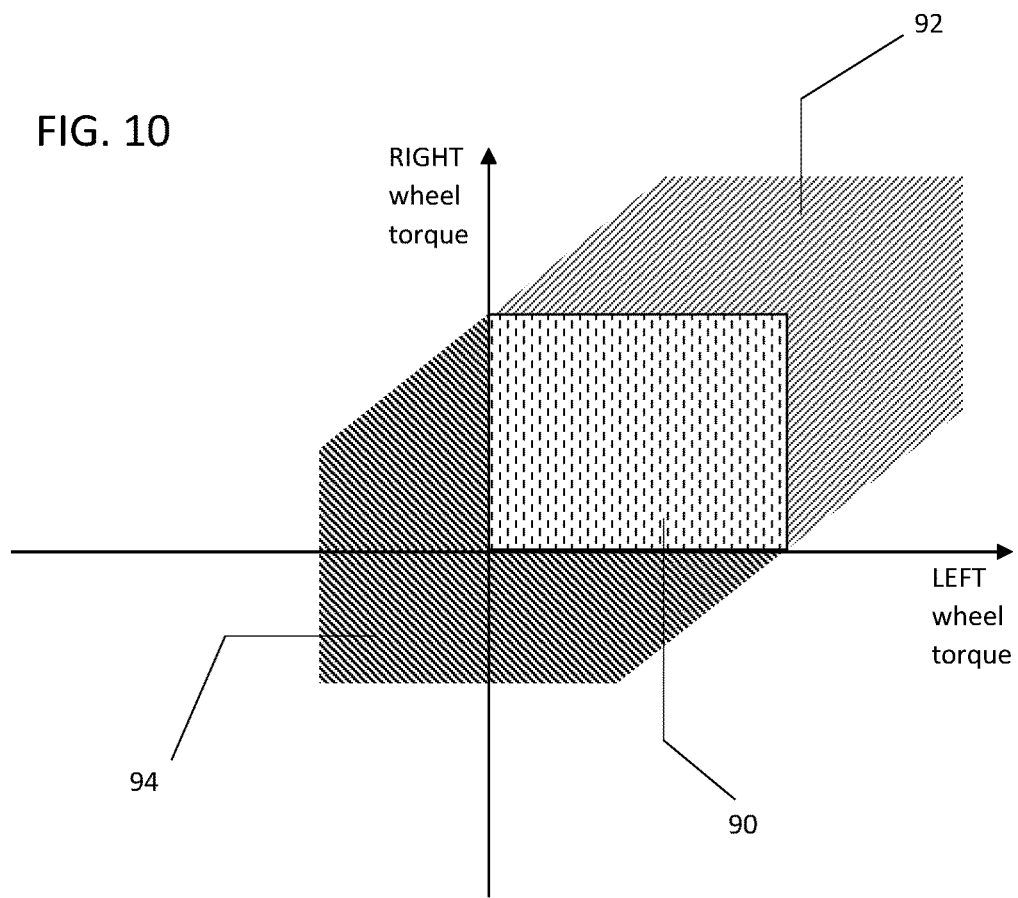
FIG. 10 shows a torque distribution graph of the present drive system.

The ability to introduce negative torque vectoring in addition to traditional positive torque vectoring opens up the performance possibilities, in particular for hybrid vehicles. A typical torque vectoring driven through only a twin clutch pack has a limited performance (zone 90) as illustrated in FIG. 10. An additional zone of performance (92) is offered by having the SI (12) provide positive drive torque to the open differential (40). An even more significant additional zone of performance (94) is offered by having the SI (12) provide a negative braking torque to the open differential (40). Instead of operating in just one quadrant of the torque distribution graph, the system is now able to be operated in all 4 quadrants, comparable to the most complex torque vectoring systems (e.g. EP0575151).

Compared to a solution where the primary and secondary drive source inputs are both combined into the input of a traditional mechanical torque vectoring differential (described, for example, in EP0575151), the present drive system (100) offers several advantages: —Torque paths primary input (10) and secondary input (12) are split in the drive system (100), meaning that the differential can be substantially downsized as it does not have to carry the total combined wheel output torque;
To achieve an on-demand mechanical AWD function, such alternative system would require an additional clutch or disconnect system, whereas in the present drive system (100), the clutch packs (50, 52) fulfil that function.
With the present drive system (100), there is no overspeeding and/or underspeeding gearing system with associated losses that are higher than the present drive system (100) because the differential speed across the clutch packs is typically higher in such setup.

Compared to a pure EM on-demand AWD system in which the secondary axle is driven purely by an EM only, an ability to combine power from the primary drive source (e.g. ICE) and secondary (e.g. EM) source further increases vehicle performance and driving dynamics. Due to the combined output torque, the presence of the open differential and the clutch packs, a much broader range of forward/rear torque variations can be generated than in a typical mechanical AWD or pure EM-on-demand AWD system. Typically, the EM power levels are modest and less than 50% of total vehicle power level, while the rear axle is best suited to carry the majority of accelerative effort due to forward-rear weight transfer under acceleration. The present drive system (100) allows that weight transfer to be fully exploited.

The present drive system (100) also shows advantages compared to a vehicle driveline setup where the primary input (10) source includes a form of hybridization (e.g. a combustion engine with P2 transmission and motor setup). Most of those have severe performance limitations because the primary input (10) source transmission will be limited in handling combined torque and power output of ICE and EM. Especially for a high performance vehicle application, these limitations would restrict the overall vehicle performance. With present drive system (100), having the EM drive the vehicle through a path completely separate from the primary drive source transmission, these restrictions are avoided.

Figure 16:
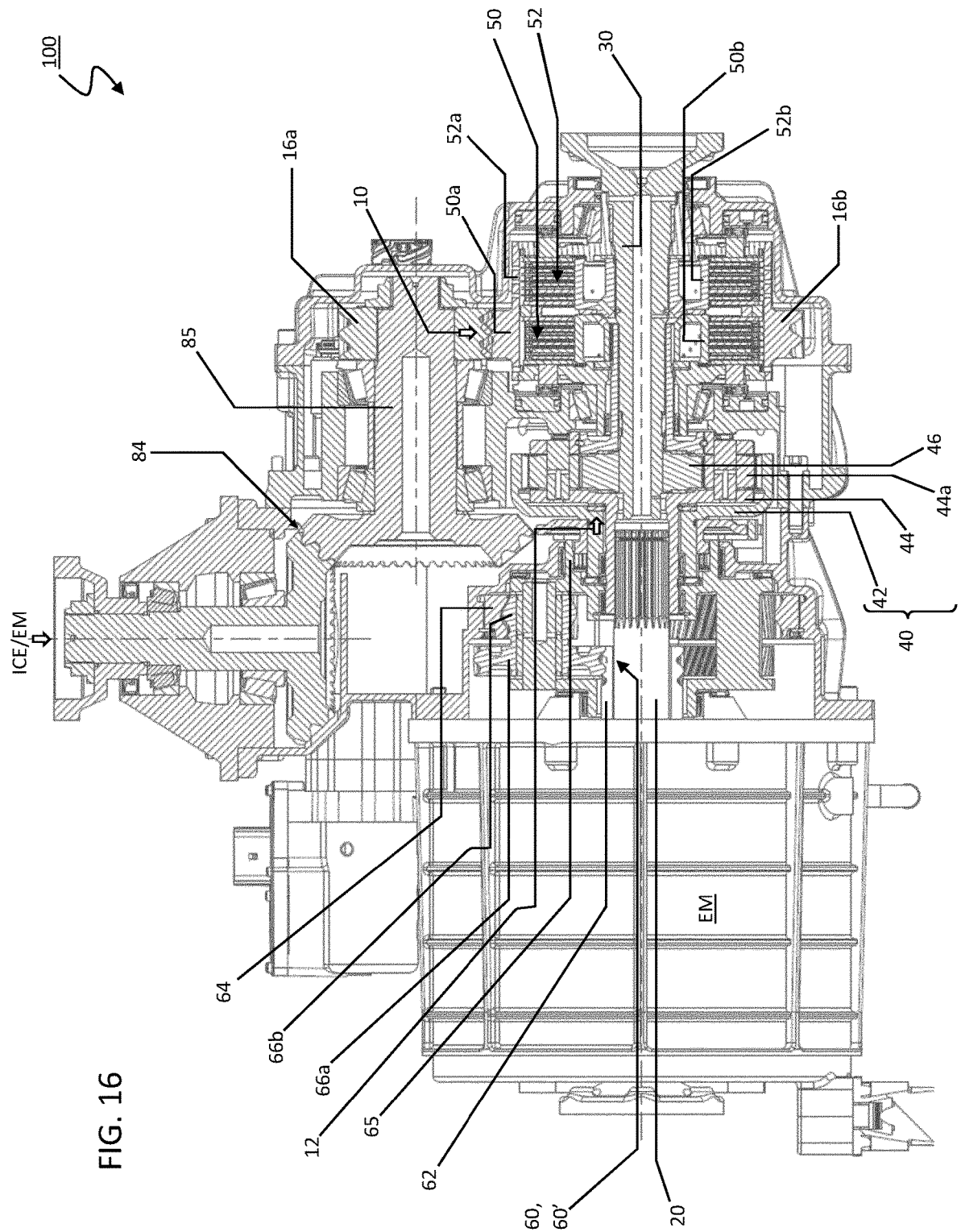
FIG. 16 is a cross-sectional view of an exemplary drive system described herein.

An example of a drive system (100) as described herein is shown in FIG. 16, depicting a cross-sectional view. Torque from a primary input source (e.g. ICE or EM) is transmitted across a bevel gear set (84) to a layshaft (85) having a fixed gear (16a) meshed with a fixed gear (16b) in fixed rotation to the inputs (50a, 50b) of the first (50) and second (52) clutch packs, which inputs (50a, 50b) form the primary input (10) of the drive system (100). The output of the first clutch pack (50) drives the first torque output shaft (20) via the open differential (40) planet carrier (44). The output of the second clutch pack (52) drives the second torque output shaft (30). Torque from a secondary input source (e.g. EM) is inputted into a speed-reducing compound planetary gear set (60, 60') comprising a sun gear (62) (input), a set of planet gears (66a, 66b) held on a planet carrier (65) (output) and a ring gear (64) held stationary e.g. with respect to a housing of the drive system (100). The output of the compound planetary gear set (60, 60') is inputted into an open differential (40) comprising a ring gear (42) (input), a set of planet gears (44a) held on a planet carrier (44) (output), and a sun gear (46) (output). The open differential (40) ring gear (42) forms the secondary input (12) into the drive system (100). The output of the sun gear (46) drives the second torque output shaft (30). The output of the planet carrier (44) drives the first torque output shaft (20). Torque output from the open differential (40) planet carrier (44) is summed with torque from one clutch pack (50) output (50*b*) in the first torque output shaft (20). Torque output from the open differential (40) sun gear (46) is summed with torque from the other clutch pack (52) output (52*b*) in the second torque output shaft (30).

The drive system (100) finds principal utility in an on-demand AWD vehicle in which a primary (e.g. front, ICE-driven) drive axle provides 100% tractive force for the most part of the driving conditions (e.g. 90% of the time), and the present drive system (100)—where the source of the primary input (10) is the ICE and the source of the secondary input (12) is the EM—drives the secondary (e.g. rear) drive axle providing tractive force under specific circumstances.

There are three main wheel driving modes of the present drive system (100) in the context of an on-demand AWD:
  (i) Only the front wheels are driven.
    In one scenario, both clutch packs (50, 52) are fully open, which disconnects both rear wheels (22, 32) from the primary input (10) source (e.g. front ICE). The secondary input (12) source (e.g. EM) is disconnected from the secondary input (10) via optional secondary input disconnect (80). The front ICE thus drives primary (e.g. front) drive axle only.
    In another scenario, primary input (10) source (e.g. ICE) is not engaged with the primary input (10) source. The secondary input (12) source (e.g. EM) is disconnected from the secondary input (12) via optional secondary input disconnect (80). The primary input (10) source thus drives primary (e.g. front) drive axle only.
  (ii) Both the front and rear wheels are driven in controllable proportions.
    In one scenario, both clutch packs (50, 52) are used to control distribution of torque from the primary input (10) source (e.g. ICE) to the front and rear wheels. The secondary input (12) source (e.g. EM) is disconnected from the secondary input (12). Torque vectoring is available.
    In another scenario, both clutch packs (50, 52) are open. The front ICE (primary input (10) source) thus drives the front drive axle only. Secondary input (12) source (e.g. EM) is connected to the secondary input (12) that drives the rear axle.
    In another scenario, both clutch packs (50, 52) are used to control distribution of torque from the primary input (10) source (e.g. ICE) to the front and rear wheels. Secondary input (12) source (e.g. EM) is connected to the secondary input (12) that drives or boosts the rear axle. Torque vectoring is available.

A third operating mode (iii) is possible within the on-demand AWD drive system (100), which is wherein the AWD drive system (100) is set so that only the rear wheels are driven. In this case, the primary input (10) source (e.g. ICE) is disconnected from the primary (e.g. front) drive axle (e.g. by a feature of the front gearbox/transmission). Torque from secondary input (12) source is distributed only to the rear wheels via the present drive system (100). Pure RWD is pure secondary input (12) source driven (e.g. EM only). This mode can offer pure electric driving, for instance, in city areas.

Switching between modes (i), (ii) and (iii) may be controlled manually or automatically.

The drive system (100) can operate in the different wheel driving modes ((i), (ii) and (iii)) set out above using different selections of torque input sources. There are three main torque input source modes of the present drive system (100):
  (a) On demand, pure secondary input (12) (e.g. EM) drive mode: In this case, both clutch packs (50, 52) are fully open, which disconnects both wheels (22, 32) from the primary input (10) source. In this mode, wheel drive mode (iii) is set. The EM drives the wheels through the open differential (40). If the primary input (10) source transmission is positioned in a neutral state or if the drive shaft (82) (where present) is disconnected from the source of the primary input (10) or from front wheels, then the clutch packs (50, 52) may be used to provide a controlled limited slip differential functionality in this mode, which results in some torque vectoring functionality.
  (b) On demand pure primary input (10) (e.g. ICE) drive mode: in this case, the clutch packs (50, 52) transfer torque from the primary input (10) source to the wheels (22, 32). In this mode, wheel drive mode (i) or (ii) may be set. The secondary input (12) source is not operated, and as has been shown, can be decoupled from the wheels via an optional secondary input disconnect (80). Full torque vectoring functionality is available.
  (c) On demand hybrid drive mode: while the secondary input (12) (e.g. EM) source is driving the wheels (22, 32) through the open differential (40), the clutch packs (50, 52) are adding torque input from the primary input (10) source (e.g. ICE) onto each wheel (22, 32). In this mode, wheel drive mode (ii) may be employed. Torque vectoring functionality is available.

Switching between modes (a), (b) and (c) may be controlled manually or automatically.

The drive system (100) can operate in a torque vectoring mode in which the distribution of torque sent to the left wheel (22) and right wheel (32), determined by extent of closure of each clutch pack (50, 52), can be the same or different depending on driving conditions. In addition to torque vectoring, the clutch packs (50, 52) may also control the torque split between the front wheels and rear wheels in an AWD set up. In a vehicle with a permanent rear wheel drive (e.g. the adapted drive system (100') of FIGS. 6 and 15) the clutch packs (50, 52) preferably control only torque vectoring.

A cylindrical gear stage (110) may be provided that distributes torque between the clutch pack (50, 52) inputs (50*a*, 52*a*) and the open differential (40) input (42). The result is an adapted drive system (100').

Figure 9:
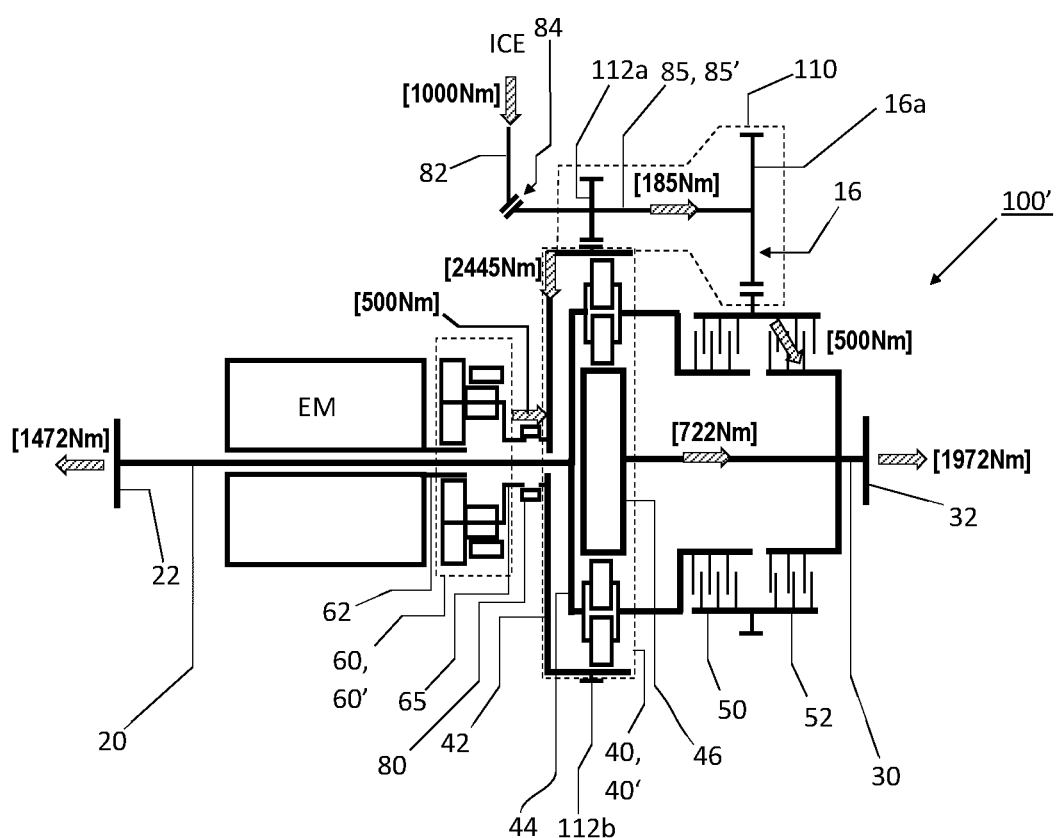
FIG. 9 shows the drive system of FIG. 6, and torque paths indicated positive torque from primary and secondary inputs.
Figure 15:
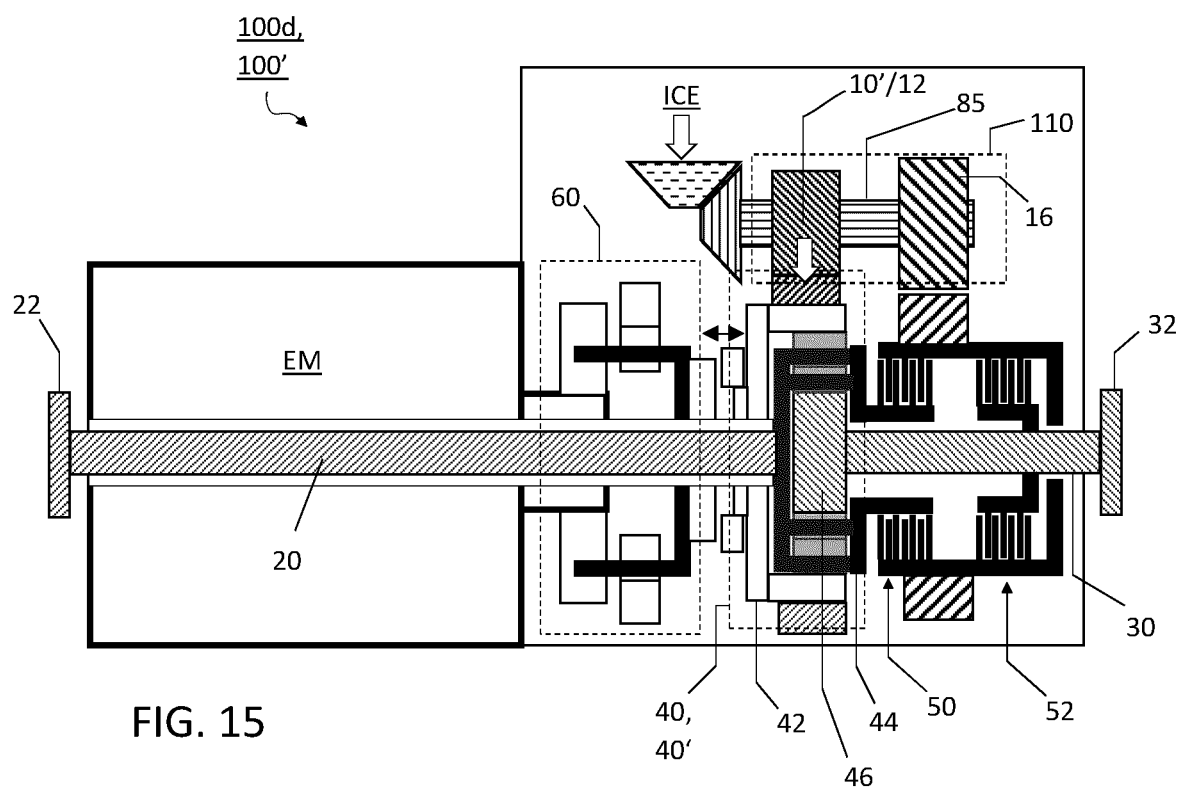
FIG. 15 is a schematic view of a $5^{th}$ configuration of a variant of the present drive system.

The cylindrical gear stage (110) may comprise the primary input gear set (16) described earlier, adapted to include an additional fixed gear (112) on the layshaft (85) (see FIGS. 6 and 15). The additional fixed gear (112*a*) meshes with a fixed gear (112*b*) on the ring (42) of the open differential (40). The gear ratios (112*a*/112*b* vs 16*a*/16*b*) may be such that open differential (40) input (ring gear (42)) rotates at a different speed than the input (50*a*, 52*a*) to the clutch packs (50, 52). The speed of the open differential (40) input (ring gear (42)) is dictated by vehicle wheel speed, whereas the clutch input (50*a*, 52*a*) speed is a result of the cylindrical gear ratio difference. By adding the cylindrical gear stage (110), the layshaft (85) acts as a drive shaft (85') that combines torque of the primary source via the additional fixed gears (112*a*/112*b*) through the open differential (40) ring gear (42) with the torque of the secondary source. Torque of both sources is summed and transferred to the open differential (40) input (42) and then to the first (20) and second (30) torque output shafts and to the wheels (22, 32); the main driving torque of the secondary drive axle is via this torque path. Torque of both sources is also summed via fixed gears (16a/16b) and transmitted along the layshaft (85)/drive shaft (85') to the input (50a, 52a) to the gear packs (50, 52); because the input (50a, 52a) to the clutch packs (50, 52) rotates faster than the differential (40) input torque vectoring is enabled via this torque path, with similar functionality as, for instance, EP0575151. When activating one of the clutch packs (e.g. 52), torque is taken from the drive shaft (85') directly to the related wheel (32), through the clutch pack (52), while the remainder of combined primary and secondary input is transferred to the wheels in 50:50 distribution by the differential. The torque split effect is illustrated in FIG. 9, assuming a bevel set ratio of 1:1, a final drive ratio of 3:1 and a 2.7:1 over-speeding ratio.

This variant is well suited for use where the primary drive axle is driven by the adapted drive system (100'). This could be in a rear wheel drive (RWD) vehicle, or an on-demand AWD vehicle but for which the other axle (not the adapted drive system (100')) would fulfil the on-demand function. The cylindrical gear stage (110) acts in this case as a final drive ratio for the primary source. The primary drive is not desired through clutch packs (50, 52) but directly in a mechanical way through the open differential (40). The EM adds power to the open differential (40) and the torque vectoring is achieved through the overspeeding ratio with clutch packs (50, 52).

This adapted drive system (100') alternatively may be employed in an on-demand AWD vehicle. An intervening differential or a clutch pack would be provided between the front and rear axles, to controllably uncouple the front and rear axles. Distribution of torque between the front and rear axles is controlled by the intervening differential or a clutch pack. Torque vectoring is achieved through the overspeeding ratio with clutch packs (50, 52)

Figure 12:
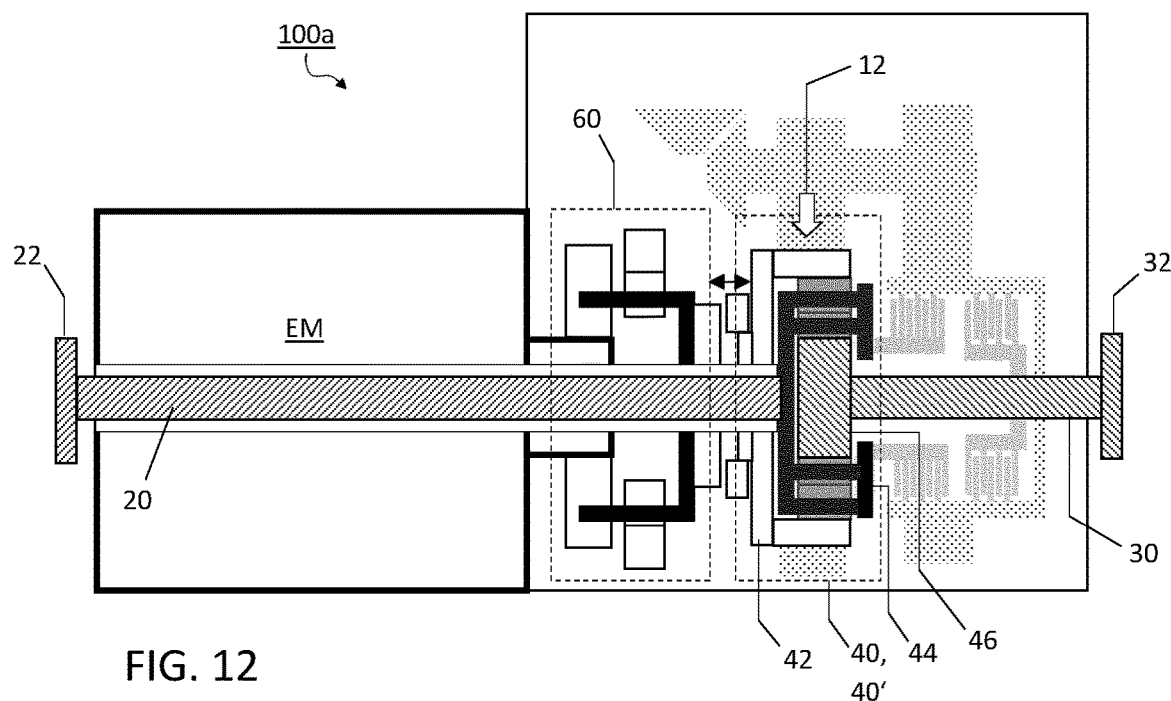
FIG. 12 is a schematic view of a basic configuration of a variant of the present drive system.
Figure 13:
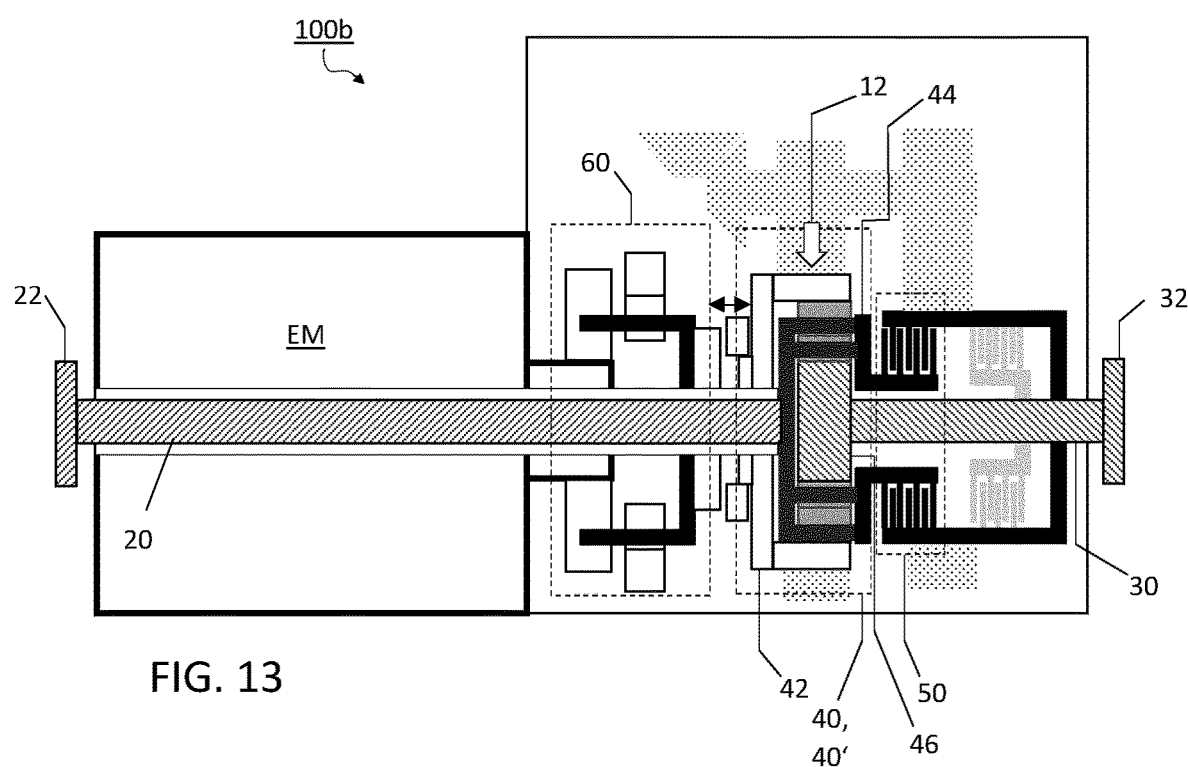
FIG. 13 is a schematic view of a $2^{nd}$ configuration of a variant of the present drive system.
Figure 14:
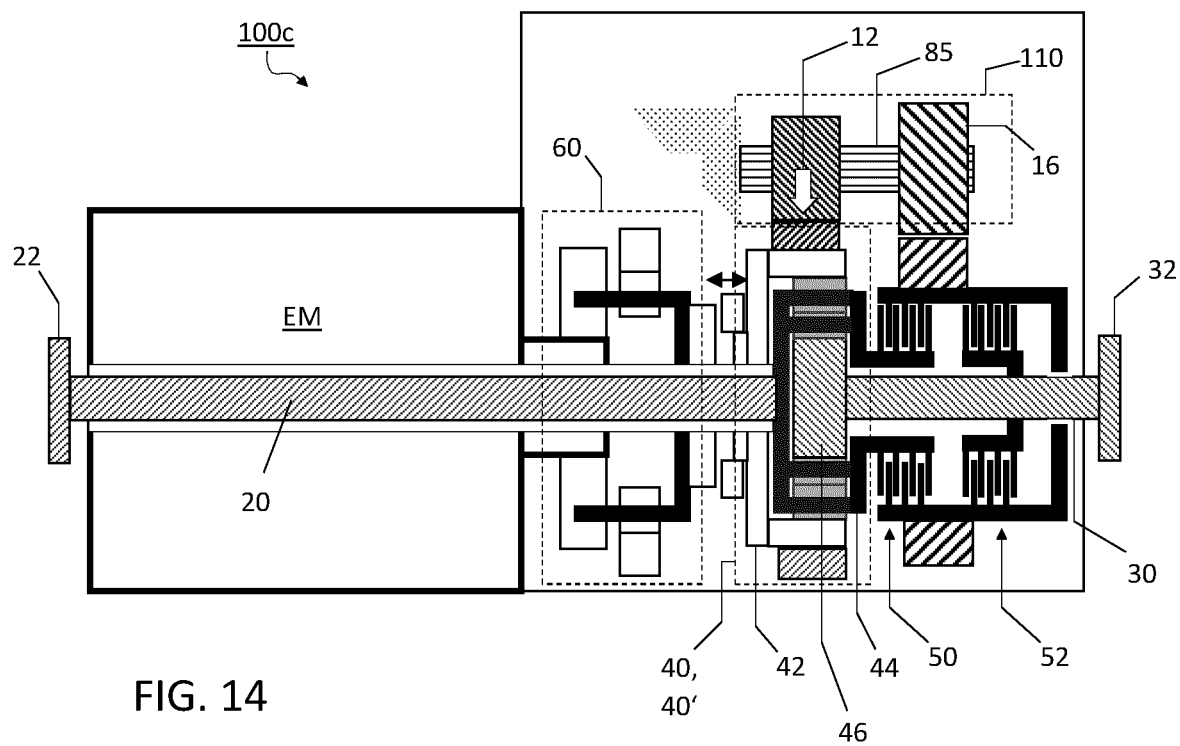
FIG. 14 is a schematic view of a $3^{rd}$ configuration of a variant of the present drive system.

Provided herein are different configurations (100a to 100d) of a drive system for a vehicle for distribution of torque from one or more inputs (10, 12), comprising a first (20) and second (30) torque output shaft (30), one for each of a left wheel (22) and a right wheel (32), and an open differential (40) that is a planetary differential, and secondary input (12) that is sourced from an electric machine (EM), wherein according to a basic configuration (100a) of the drive system:
  a planet carrier (44) of the planetary differential (40) is attached to one of the torque output shafts (20, 30) (it may be attached such they rotate synchronously, direct connection (no intervening gears); it may be attached preferably to the 1st output shaft (20);
  a sun gear (46) of the planetary differential is attached to one of the torque output shafts (20, 30) (it may be attached such they rotate synchronously, direct connection (no intervening gears); it may be attached preferably to the 2nd output shaft (30); such that the axes of rotation of the torque output shafts (20, 30) are co-axial,
  the secondary input (12) is connected (directly or indirectly) to a ring gear (42) of the planetary differential.
A $2^{nd}$ (100b), a $3^{rd}$ (100), a $4^{th}$ (100c), and $5^{th}$ (100d, 100') configuration of the drive system (100) are additions to the basic configuration. The different configurations are exemplarily shown in FIGS. 12 to 15. The basic configuration is exemplified in FIG. 12. The components depicted without black borders and shaded grey are possible components that may be added to form the 2nd, 3rd, 4th, and 5th configurations. The basic configuration is secondary input (12) (EM) driven. The parts of drive system (100) have been described elsewhere herein; other parts describe herein may be present.

The 2nd configuration (100b) (e.g. FIG. 13) is the basic configuration (e.g. FIG. 12) adapted by connecting a clutch pack (50) for controllable transfer of torque between the planet carrier (44) and the torque output shaft (30) that is connected to the sun gear (46) (e.g. to the $2^{nd}$ output shaft (30)). Single clutch pack can provide a controllable limited slip differential functionality. It could be good to add for the 2nd configuration that the function of the single clutch pack is essentially to provide a controllable limited slip differential functionality. The axis of rotation of clutch pack (plates) is co-axial with axes of rotation of the torque output shafts (20, 30). The clutch pack (50) (plates) is disposed around (concentrically outside) one of the first (20) or second (30) torque output shaft (30), preferably second (30) torque output shaft (30). The clutch pack (50) (plates) is introduced by sliding over the first (20) or second (30) torque output shaft (30), preferably second (30) torque output shaft (30). The components depicted without black borders and shaded grey are possible components that may be added to form the 3rd, 4th, and 5th configurations. The $2^{nd}$ configuration is secondary input (12) (EM) driven. The parts of drive system (100) have been described elsewhere herein; other parts described herein may be present.

The $3^{rd}$ configuration (100c) (e.g. FIG. 14) is the basic configuration (e.g. FIG. 12) adapted by
  connecting a first (50) and a second (52) clutch pack, for controllable transfer of torque:
    by the first clutch pack (50) between a layshaft (85) of a cylindrical gear stage (110) and planet carrier (44);
    by the second clutch pack (52) between the layshaft (85) of the cylindrical gear stage (110) the torque output shaft (30) that is connected to the sun gear (46);
  providing the cylindrical gear stage (110) to transfer torque between the ring gear (42) and input to the first (50) and second (52) clutch packs.

The cylindrical gear stage (110), as mentioned elsewhere herein, comprises a layshaft (85) having a fixed gear (16) that meshes to a fixed gear (16b) connected in fixed rotation to the input (50a, 52a) of the clutch packs (50, 52), and having an additional fixed gear (112a) that meshes with a fixed gear (112b) in fixed rotation with the ring (42) of the open differential (40). The cylindrical gear stage (110) enables torque to be transferred to either of the output shafts (20, 30) parallel to or bypassing the open differential (40), thus enabling torque vectoring.

The axis of rotation of clutch packs (50, 52) (plates) are co-axial with axes of rotation of the torque output shafts (20, 30). The clutch packs (50, 52) (plates) are disposed around (concentrically outside) one of the first (20) or second (30) torque output shaft (30), preferably second (30) torque output shaft. The clutch packs (50, 52) (plates) are introduced by sliding over the first (20) or second (30) torque output shaft), preferably second (30) torque output shaft. The first clutch pack (50) is axially displaced from the 2nd clutch pack (52). The first clutch pack (50) is closer to the planet carrier (44). The components depicted without black borders and shaded grey are possible components that may be added to form the 4th, and 5th configurations. The $3^{rd}$ configuration is EM driven. It allows some torque vectoring. The parts of drive system (100) have been described elsewhere herein; other parts describe herein may be present.

The 4th configuration (100) (e.g. FIGS. 1 to 6) is the basic configuration (e.g. FIG. 12) adapted by:

providing a primary input (10) that is from a 2nd EM or an ICE;
connecting a first (50) and a second (52) clutch pack, for controllable transfer of torque:
by the first (50) clutch pack between the primary input (10) and planet carrier;
by the second (52) clutch pack between the primary input (10) and the torque output shaft (30) that is connected to the sun gear (46).

The 4th configuration corresponds to the drive system (100) substantially described herein.

The axis of rotation of clutch packs (50, 52) (plates) are co-axial with axes of rotation of the torque output shafts (20, 30). The clutch packs (50, 52) (plates) are disposed around (concentrically outside) one of the first (20) or second (30) torque output shaft (30), preferably second (30) torque output shaft (30). The clutch packs (50, 52) (plates) are introduced by sliding over the first (20) or second (30) torque output shaft (30), preferably second (30) torque output shaft (30). The first clutch pack (50) is axially displaced from the 2nd clutch pack (52). The first clutch pack (50) is closer to the planet carrier (44). The 4th configuration is driven by a secondary input (12) (e.g. sourced from an EM)) and primary input (10) (e.g. sourced from an ICE) i.e. is a hybrid configuration. It allows torque vectoring. The parts of drive system (100) have been described elsewhere herein; other parts describe herein may be present.

The 5th configuration (100d, 100') (e.g. FIG. 15) is the basic (e.g. FIG. 12) configuration adapted by:
providing a primary input (10') that is sourced from an ICE or $2^{nd}$ EM
connecting a first (50) and a second (52) clutch pack, for controllable transfer of torque:
by the first clutch pack (50) between a layshaft (85) of a cylindrical gear stage (110) and planet carrier (44);
by the second clutch pack (52) between the layshaft (85) of the cylindrical gear stage (110) the torque output shaft (30) that is connected to the sun gear (46);—
providing the cylindrical gear stage (110) (over-speeding gearset) to transfer torque between the ring gear (42) and input to the first (50) and second (52) clutch pack, wherein torques from both the secondary input (12) (e.g. sourced from an EM)) and primary input (10') (e.g. sourced from an ICE) drive the cylindrical gear stage (110).

The $5^{th}$ configuration (100d) corresponds to the adapted drive system (100') described elsewhere herein containing the cylindrical gear stage (110). The cylindrical gear stage (110) comprises a layshaft (85) having a fixed gear (16) that meshes to a fixed gear (16b) connected in fixed rotation to the input (50a, 52a) of the clutch packs (50, 52), and having an additional fixed gear (112a) that meshes with a fixed gear (112b) in fixed rotation with the ring (42) of the open differential (40). The layshaft (85) can accept input from both sources. The cylindrical gear stage (110) enables torque to be transferred to either of the output shafts (20, 30) parallel to or bypassing the open differential (40), thus enabling torque vectoring.

The axis of rotation of clutch packs (50, 52) (plates) are co-axial with axes of rotation of the torque output shafts (20, 30). The clutch packs (50, 52) (plates) are disposed around (concentrically outside) one of the first (20) or second (30) torque output shaft (30), preferably second (30) torque output shaft (30). The clutch packs (50, 52) (plates) are introduced by sliding over the first (20) or second (30) torque output shaft (30), preferably second (30) torque output shaft (30). The first clutch pack (50) is axially displaced from the 2nd clutch pack (52). The first clutch pack (50) is closer to the planet carrier (44). The $5^{th}$ configuration is driven by a secondary input (12) (e.g. sourced from an EM)) and a primary input (10') (e.g. sourced from an ICE) i.e. is a hybrid configuration. It allows full torque vectoring. The parts of drive system (100) have been described elsewhere herein; other parts describe herein may be present.

The drive system (100) is typically encapsulated by one or more housings. The housing protects it from ingress of debris, and may act as an oil sump. The drive system may comprise additional features that the skilled person will understand are conventional in a drive system, such as:
actuating devices for the clutches. These could be electromechanical, electrohydraulic, or any other type;
oil, cooler, sensors, wiring, bearings, seals and other components.

Provided is a vehicle drive line for an on-demand all wheel drive, AWD, vehicle comprising:
a front axle driven by a source of primary input (10) (e.g. ICE);
a rear axle driven by the drive system (100) described herein comprising a source of secondary input (12) (e.g. EM);
a drive shaft (82) for transfer of torque between the front axle and rear axle), optionally wherein the source of the secondary input (12) is selectably engagable with or disengagable from the open differential (40).

Provided is a vehicle drive line for a rear-wheel drive vehicle comprising:
a source of primary input (10) (e.g. ICE);
rear axle driven with the drive system (100) described herein or with the adapted drive system (100') described herein, comprising a source of secondary input (12);
a transmission and/or drive shaft (82) for transfer of torque between the source of primary input (10) and the primary input (10) of the drive system (100),
optionally wherein the source of the secondary input (12) is selectably engagable with or dis-engagable from the open differential (40).

The invention claimed is:
1. A drive system for a vehicle for variable distribution of torque, from a primary input and secondary input, between a left wheel and a right wheel of a vehicle, the drive system comprising a first and second torque output shaft, one for each of the left wheel and the right wheel, an open differential, and independently controllable first and a second clutch packs, configured such that:
torque from the primary input is transferred to each of the torque output shafts via the clutch packs;
torque from the secondary input is transferred to each of the torque output shafts via the open differential;
torque from one output of the open differential is summed with torque from one clutch pack output in the first torque output shaft; and
torque from another output of the open differential is summed with torque from the other clutch pack output in the second torque output shaft;
wherein the drive system, further comprises a secondary input gear set configured to change a rotation speed of the source of secondary input before entering the clutch pack; and
wherein the secondary input gear set is a compound planetary gear set, wherein the source of the secondary input drives a sun gear of the compound planetary gear set, and the output of the compound planetary gear set that is a planet carrier of compound planetary gear set transmits torque to an input of the open differential.

2. The drive system according to claim 1, wherein the open differential is an open planetary differential.

3. The drive system according to claim 2, wherein the open planetary differential is configured such that torque from the secondary input is transferred via a ring gear of the planetary differential to a planet carrier of the planetary differential and to a sun gear of the planetary differential, torque is transferred from the planet carrier to one of the torque output shafts, and torque is transferred from the sun gear to the other of the torque output shafts.

4. The drive system according to claim 1, wherein the central axes of rotation of the open differential, and two torque output shafts, and two clutch packs are co-axially aligned.

5. The drive system according to claim 1, wherein an output of the source of the secondary input is selectably engageable with or disengageable from the open differential.

6. The drive system according to claim 5, wherein the selectable engagement with or disengagement from the open differential is realised by a secondary input disconnect is positioned between the output of the secondary input gear set, and the open differential.

7. The drive system according to claim 1, further comprising a primary input gear set configured to change, preferably reduce, a rotation speed of the source of the primary input before entering the clutch pack.

8. The drive system according to claim 1, wherein:
torque from the primary input is sourced from an Internal Combustion Engine and torque from the secondary input is sourced from an electric machine, or
torque from the primary input is sourced from an electric machine and torque from the secondary input is sourced from an Internal Combustion Engine.

9. A vehicle drive line for an on-demand all wheel drive, AWD, vehicle comprising:
a front axle driven by a source of primary input;
a rear axle driven by the drive system according to claim 1 comprising a source of secondary input;
a drive shaft for transfer of torque between the front axle and rear axle.

10. The drive system according to claim 2, wherein the central axes of rotation of the open differential, and two torque output shafts, and two clutch packs are co-axially aligned.

11. The drive system according to claim 2, wherein an output of the source of the secondary input is selectably engageable with or disengageable from the open differential.

12. The drive system according to claim 1, wherein the central axes of rotation of the open differential, and two torque output shafts, and two clutch packs, and an electric machine for generating torque as a source of the secondary input are co-axially aligned.

13. The vehicle drive line for an on-demand all wheel drive, AWD, vehicle according to claim 9, wherein the source of the secondary input is selectably engagable with or disengagable from the open differential.

14. The drive system according to claim 2, wherein the central axes of rotation of the open differential, and two torque output shafts, and two clutch packs, and an electric machine for generating torque as a source of the secondary input are co-axially aligned.

15. The drive system according to claim 1, wherein the secondary input gear set is configured to reduce the rotation speed of the source of secondary input before entering the clutch pack.

16. The drive system according to claim 11, wherein the selectable engagement with or disengagement from the open differential is realised by a secondary input disconnect is positioned between the output of the secondary input gear set, and the open differential.

17. The drive system according to claim 2, further comprising a primary input gear set configured to change, preferably reduce, a rotation speed of the source of the primary input before entering the clutch pack.

18. The drive system according to claim 2, wherein:
torque from the primary input is sourced from an Internal Combustion Engine and torque from the secondary input is sourced from an electric machine, or
torque from the primary input is sourced from an electric machine and torque from the secondary input is sourced from an Internal Combustion Engine.

* * * * *